United States Patent [19]

Genba et al.

[11] Patent Number: 4,524,042
[45] Date of Patent: Jun. 18, 1985

[54] PROCESS FOR PRODUCING HYDRAULICALLY SETTING EXTRUDING MATERIALS

[75] Inventors: Tsuneo Genba; Akio Mizobe; Masaki Okazaki, all of Okayama, Japan

[73] Assignee: Kuraray Co., Ltd., Kurashiki, Japan

[21] Appl. No.: 515,545

[22] Filed: Jul. 20, 1983

[30] Foreign Application Priority Data

Aug. 9, 1982 [JP] Japan .................. 57-138996

[51] Int. Cl.³ .............................................. D02G 1/20
[52] U.S. Cl. .................................... 264/211; 106/90; 106/99; 264/128; 264/185; 264/349
[58] Field of Search ............... 264/108, 128, 185, 211, 264/349; 106/99, 90

[56] References Cited

U.S. PATENT DOCUMENTS

| | | | |
|---|---|---|---|
| 2,716,049 | 8/1955 | Latour | 264/185 |
| 2,936,488 | 5/1960 | Cottet et al. | 264/185 |
| 3,067,152 | 12/1962 | Fukushima | 264/185 |
| 3,279,501 | 10/1966 | Donald | 264/108 |
| 3,318,990 | 5/1967 | Kajitani | 264/185 |
| 3,404,203 | 10/1968 | Donald | 264/108 |
| 3,453,818 | 7/1969 | Novak et al. | 264/108 |
| 3,584,095 | 6/1971 | Heider et al. | 264/108 |
| 3,616,165 | 10/1971 | Nishi | 264/185 |
| 3,639,331 | 2/1972 | Hattori et al. | 264/108 |
| 3,702,356 | 11/1972 | Hall | 264/211 |
| 3,770,859 | 11/1973 | Bevan | 264/108 |
| 3,781,396 | 12/1973 | Okuda et al. | 264/349 |
| 3,836,412 | 9/1974 | Boustany et al. | 264/108 |
| 3,850,901 | 11/1974 | Tanaka et al. | 264/185 |
| 3,987,140 | 10/1976 | Mizobe et al. | 264/185 |
| 4,192,690 | 3/1980 | Meyer et al. | 264/349 |
| 4,199,366 | 4/1980 | Schaefer et al. | 106/90 |
| 4,428,775 | 1/1984 | Johnson et al. | 106/90 |
| 4,440,711 | 4/1984 | Kwon et al. | 264/185 |

FOREIGN PATENT DOCUMENTS

0667582 3/1952 United Kingdom ............... 264/185

*Primary Examiner*—Jeffery Thurlow
*Assistant Examiner*—Patrick Dailey
*Attorney, Agent, or Firm*—Oblon, Fisher, Spivak, McClelland & Maier

[57] ABSTRACT

In a process for producing fiber-reinforced hydraulically setting extruding materials, the process which comprises, not adding the reinforcing fiber in the form of single fibers to the starting materials, but employing it as collected yarns by collecting the single fibers with a collecting agent, uniformly dispersing them in the starting materials, then releasing the collected condition of said dispersed collected yarns and splitting into single fibers by swelling and dissolution of the collecting agent and by the shear force by a screw etc., thereby the dispersion is improved.

The single fibers having a great aspect ratio which have been released from the collected condtion are uniformly dispersed in the extruding material, and a remarkable reinforcing effect is obtained.

10 Claims, 1 Drawing Figure

PROCESS FOR PRODUCING HYDRAULICALLY SETTING EXTRUDING MATERIALS

BACKGROUND OF THE INVENTION

1. Field of the Invention

This invention relates to a process for producing hydraulically setting extruding materials reinforced with polyvinyl alcohol fibers (hereinafter referred to as PVA fibers).

2. Description of the Prior Art

In recent years, extruding hydraulically setting materials reinforced with asbestos fibers show a remarkable growth mainly as interior and exterior construction materials in virtue of not only their excellent physical properties such as high degree of strength, and lightweightness, sound insulating properties, heat retaining properties etc. resulting from the blow molding but also their easy workability.

Hydraulically setting materials such as cement etc. have features of high compression strength, excellent inflammability and durability and inexpensiveness but suffer from disadvantages that the tensile strength, bending strength and impact strength are low and further that they tend to easily crack and are poor in dimentional stability.

Therefore, in order to offset the above-described drawbacks and improve the molding properties and shape retaining properties of said extruding hydraulically setting materials, asbestos fibers are generally employed. However, asbestos fibers have lately been strongly adversely pointed out for their harmness to human health, and many leading countries in the world have set severe regulations on their use which seem to become even severer. Among those, even some countries have already totally banned their industrial utilization. Also in Japan, this is designated as a specific chemical substance by the Industrial Safety and Hygiene Law, and there are various restrictions on their actual use.

Under such circumstances, reinforcing fibers which can replace the asbestos fibers have been eagarly sought, and many studies have been made, yet no product has been materialized in the field of extruding hydraulically setting materials. One main reason for this is that it is impossible to uniformly disperse fibers in extruding materials.

A general process for producing extruding materials comprises adding a small amount of a tackifier (e.g. methyl cellulose etc.) to a matrix material chiefly comprising a hydraulically setting material such as cement to impart viscosity, further adding 20–30% by weight of asbestos fibers of a grade with a shorter fiber length to impart moldability and reinforcement, mixing under dry conditions, thereafter adding a small amount of water, kneading the mixture in a screw-type kneader, connecting with an extruder and extruding through a die to obtain an extruded product.

In hydraulically setting materials such as asbestos slates etc., which are molded by the so-called wet type sheet making process, organic fibers such as Vinylon, polypropylene, nylon etc. have already been commercially employed as substitutes or supplements for the asbestos fibers. In such a case, a matrix material and fibers are mixed and dispersed together as a dilute slurry (50–200 g/l), then dipped up on a round or rectangular screen, and excess water is removed by a press to obtain a product. Since the fibers are dispersed in a dilute slurry, a uniform dispersion may be easily obtained.

On the other hand, in the case of extruding materials, the amount of water is restricted from an aspect of the shape retaining properties. In other words, in order to uniformly extrude from a die, it is preferred to be more flowable, that is, abundant in water, whereas in order to retain the extruded shape as it is (i.e. shape retaining properties), less flowability is more preferred. Further in the case of the present method, since it is impossible to take a step of forcedly removing the water content after extruding, it is preferred to reduce the amount of water added (i.e. reduce the ratio of water-hydraulically setting material) commonly recognized in the art. In order to solve such a problem, it is practiced to make a highly viscous matrix having flowability and also good shape retaining properties by employing a reduced amount of water and further employing an appropriate amount of an organic polymer such as methyl cellulose etc. as a tackifier. However, the dispersion of the fibers in such a highly viscous matrix is remarkably difficult, and no satisfactory extruded product is obtained. Even the organic fibers employed in the above-mentioned wet type sheet making process cannot be uniformly dispersed in extruding materials.

On the other hand, among inorganic fibers, alkali-resistant glass fibers are being under study. However, said fibers are brittle in nature and have a drawback of being very fragile, and therefore, as a countermeasure, they are used as collected yarns but still are seriously damaged by the shear force by a screw on kneading and extruding in the extruding step, and no reinforcing effect is obtained ("Shin-Kenchiku Doboku Fukugo Zairyo", p. 443, published from Jōhō Kaihatsu-sha, October, 1979). In addition, it is pointed out that their alkali resistance is not adequate, and accordingly their durability is doubted because most hydraulically setting materials exhibit alkalinity.

Steel fibers are not usable, not only because they are poor in flexibility and hence poor in moldability, for example, they tend to bend by the shear force during the extruding step, they cannot be smoothly extruded etc., but also because they remarkably deteriorate the appearance of the final products.

In spite of the fact that the replacement of the asbestos fibers has been eagarly sought as described above, there are no substitutes suitable for extruding materials, and the present situation is such that asbestos fibers are inevitably employed in such large amounts as 20–30%. Under such circumstances, the present inventors have been intensively studying on the replacement of the asbestos fibers and have come to the present invention.

Although the reinforcing mechanism of a brittle substance by a fibrous material is not simple, it may be typically considered as follows: that is, the reinforcing mechanism is a problem between the bearing of the stress by the fibers and the reinforcing efficiency. As for the former factor, when an external stress, such as that represented by pulling, is applied to a composite reinforced by a shortly-cut fibrous material, the stress imposed on the total composite is ideally expressed by Stress Borne by the Reinforcing Material + Stress Borne by the Matrix = Stress Borne by the Composite and even after fine cracks have been generated in the brittle matrix, the member of the left effectively functions and the strength as the total composite is enhanced (Hannant). More specifically, using 1 for the fiber length of short fibers, Lc for the critical fiber length, σfu for the breaking strength of the fibers and Vf for the volume fraction taken as the amount added, then the reinforcing effect by the fibers σR as regards pulling may be expressed as $$\sigma R = \eta \sigma fu \left(1 - \frac{lc}{2l}\right) Vf \quad (1)$$

wherein η is the orientation coefficient of the fibers.

On the other hand, taking τ for the interfacial bonding force between the fibers and the matrix and d for the diameter of the fibers by presuming the fibers in the cylindrical form, then the critical fiber length has the following relationship:

$$lc = \frac{fu \cdot d}{2\tau} \quad (2)$$

then the equation (1) may be converted into $$\sigma R = \eta \sigma fu \left(1 - \frac{fu}{4\frac{1}{d}\tau}\right) Vf \quad (3)$$

To summarize, in order to enhance the reinforcing effect by the fibers, it is required (a) that the strength should be high, (b) that the interfacial bonding power (τ) with the matrix should be high, (c) that from a morphological aspect of the fibers, the ratio l/d (hereinafter referred to as the aspect ratio) should be great, that is, the fibers should be thin and long, and (d) that the volume fraction of the fibers should be great. As regards the requisites (c) and (d), they may be freely chosen as long as man-made fibers are used. Therefore, if the fibers can be uniformly dispersed in the matrix, the reinforcing effect by the fibers is now governed by the aforesaid (a) strength of the fibers and (b) interfacial bonding power with the matrix.

As can be seen from that their primary use is in the industrial material field, PVA fibers are highly strong. Also regarding the interfacial bonding power, since the chemical interfacial bonding power is high because PVA molecule chains contain hydroxyl groups having strong affinity to hydraulically setting materials and also since there are numerous small ribs on the fiber surface because the wet or dry spinning was effected and a high degree of drawing was imparted, they have a feature that the resistance to pulling in the matrix is high, that is, the physical interfacial bonding power is also high.

On the other hand, since those generally known as highly strong fibers, for example, organic fibers such as aramides, polyesters, nylon etc., carbon fibers and glass fibers, have poor bonding power, slip-off is brought about and the strength of the fiber per se cannot be effectively utilized, and as a result, the reinforcing effect is small. In addition, since the polyester and glass fibers are remarkably low in alkali resistance, they will give rise to a problem concerning durability if used in hydraulically setting materials which exhibit alkalinity, and the carbon fibers and aramides represented by Kevlar etc. are extremely expensive.

The PVA fibers are not only highly strong and good in bonding power with a hydraulically setting matrix, as hereinabove described, but also excellent in alkali resistance and weather resistance and further comparatively inexpensive. Thus, for reinforcing a hydraulically setting brittle matrix such as cement etc., the PVA fibers are most suitable. Therefore, it is believed that these are the most suitable materials as substitutes for asbestos fibers in asbestos fiber-reinforced extruding materials. However, investigations on the use of PVA fibers as reinforcing materials in extruding materials have been hardly made, and of course they have never been used industrially.

As described hereinabove, the reason for why they have hardly been studied in the extruding material field in spite of that they have excellent physical properties as reinforcing materials is entirely due to that it has been impossible to uniformly disperse them. The aforesaid equation (3) can only been established when the fibers have been uniformly dispersed in the matrix, and it is needless to say that if the dispersed condition is poor, the reinforcing effect is gravely impaired. Dispersion of the fibers is governed extensively by the aspect ratio. In other words, when the aspect ratio is lessened, the dispersion tends to be improved, but, as can be understood from the equation (3), the intended reinforcing effect is reduced. On the other hand, if the aspect ratio is increased, the intended reinforcing properties tend to become great, but the reinforcing properties would be reduced due to the aggravation of the dispersion and thus the actual reinforcing effect sometimes begins to decrease. Further, poor dispersion deteriorates the appearance, which leads to the loss of the commercial value. In the extruding process, which is different from the wet type sheet making process which, as described hereinabove, involves a dilute slurry by using a large amount of water, the amount of water added to a hydraulically setting matrix such as cement etc. is extremely small, and further dispersion of fibers is effected by e.g. a screw which has a relatively low rotational speed in the kneading and extruding steps, and therefore it is very difficult for such a process to disperse the fibers. Asbestos fibers are considered very good in dispersibility in a hydraulically setting material and this is one of the reasons for their extended use for reinforcing hydraulically setting materials coupled with their excellent fiber physical properties. Even with said asbestos fibers, for that reason that those presently employed for extrusion cannot be dispersed, Classes 6 and 7 which are in the form of powder having short fiber lengths are merely employed, from which it is easily recognized how difficult the uniform dispersion of the fibers in the extrusion process is. Said asbestos fibers have only a low reinforcing effect because of their powder form, and therefore under the present situation, the use of such large amounts as 20–30% is inevitable.

As described hereinabove, it is a common knowledge in the art that on producing an extruding material, fibers having a reinforcing effect, which are thin and long, i.e. which have a great aspect ratio, cannot be uniformly dispersed. Under such circumstances, the present inventors have been studying in order to uniformly disperse PVA fibers having basically excellent reinforcing characteristics and having a great aspect ratio in an extruding material, and have finally come to the present invention.

SUMMARY OF THE INVENTION

Accordingly, the present invention is a process for producing extruding materials which comprises fixing fibers having a great aspect ratio with a collecting agent to thicken them into collected yarns which have a substantially reduced aspect ratio and hence are easily dispersible, then uniformly dispersing them during the production process for the extruding material, then splitting said dispersed collected yarns into single fibers and dispersing them by swelling and dissolution of the collecting agent and by a shear force by a screw etc. As a result, in the extruding material, the single fibers having a great aspect ratio which have been released from the collected condition are now uniformly dispersed, and thus a remarkable reinforcing effect may be achieved.

More specifically, PVA single fibers having strength of 40 kg/mm$^2$ or more and 0.5-2.5 denier are collected into 200-10,000 denier, fixed with a hydrophilic resin, thereafter cut into appropriate length so that the aspect ratio of the single fiber units is 50-700. The aspect ratio of the collected yarn units of the cut PVA fibers is as small as about 2-35. Thereafter, they are mixed with a matrix chiefly comprising a hydraulically setting material preferably under dry conditions, and kneaded and extruded by using a kneader and an extruder employed in the extrusion process.

DETAILED DESCRIPTION OF THE PREFERRED EMBODIMENTS

Figure 1:
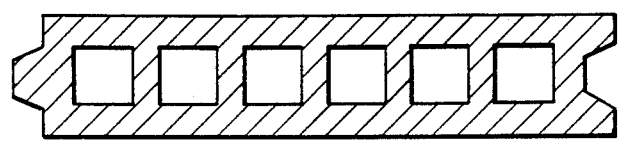
FIG. 1 is a transverse cross-section of an example of extruded materials extruded according to the present invention.

The shape of the fibers present in the extruding material is mainly in the form of single fibers, and the collected yarns are a measure for uniformly dispersing the product as described above. Therefore, it is principally the single fibers that govern the reinforcing properties of the extruding material. Accordingly, the conditions which the single fibers according to this invention should satisfy are described first. As described above, where a brittle extruding hydraulically setting material is to be reinforced with fibers, the essential conditions for the fibers are that the adhesion with the matrix is excellent, and that the physical properties such as tensile strength etc. are excellent, but in order to maximize the reinforcing effect, there is a prerequisite that they should be uniformly dispersed in the matrix.

The measure for uniformly dispersing in the matrix is to fix single fibers with a hydrophilic resin, mixing the thus obtained collected yarns with a matrix powder preferably under dry conditions, then adding water, kneading and extruding using an extruder. Since by adding water, the hydrophilic resin, i.e. the collecting agent, has become swollen or dissolved to reduce its collecting power and the collected yarns are spplied to the extruder under such conditions, 60% or more of the collected yarns of 200-10,000 denier are split by a shear force by e.g. a screw in said step into single fibers of 0.5-25 denier.

Unless the appropriate single fiber denier and aspect ratio are selected in the step of splitting these collected yarns into single fibers, the split single fibers are intertwined with each other to form small fiber balls, which deteriorate the dispersed condition and thus the effort to disperse via the collected yarns would result in failure.

The aspect ratio has contradictory requirements as described above, that is, the smaller the better in view of the dispersibility, while the larger the better in view of the reinforcing properties, and therefore it is important to select an appropriate aspect ratio which satisfies both. The aspect ratio of the PVA fibers to be used for extrusion is suitably 50-700, more preferably 200-500. With less than 50, although there is no aggravation in dispersion due to the intertwining in the step of splitting the collected yarns, the reinforcing properties are poor. On the other hand, with greater than 700, although the reinforcing properties are inherently excellent, the dispersibility is poor and the actual reinforcing properties are reduced. In addition, the appearance of the product is marred and thus it is not preferred.

The single fiber denier is not so influential as the aspect ratio on the dispersibility and reinforcing properties, but is suitably 0.5-2.5 denier as the result of various experiments. With less than 0.5 denier, even if the aspect ratio is limited to 50-700, the dispersion is poor, whereas with greater than 25 denier, the reinforcing properties are reduced and also the appearance of the extruded product is poor, thus leading to the loss of the commercial value.

The strength of the fiber should be 40 kg/mm$^2$. With less than 40 kg/mm$^2$, a satisfactory reinforcing effect cannot be expected even if the dispersibility and adhesion are good.

As described hereinabove, the conditions which the single fibers should satisfy are strength of 40 kg/mm$^2$, an aspect ratio of 50-700 and a denier of 0.5-25, which are the first requirement constituting the present invention.

This invention resides in the use of the collected yarns as a measure for uniformly dispersing the aforesaid single fibers through the matrix.

It is important that the collected yarns are uniformly dispersed through the matrix and 60% or more thereof are split into single fibers mainly in the extrusion step. The present inventors have discovered that by restricting the total denier of the collected yarns, the kind of the collecting agent and the pick-up, the purpose may be achieved.

One of the important conditions which the collected yarns should satisfy is their thickness, i.e. the total denier number, which is suitably 200-10,000, more preferably 1,000-5,000. With less than 200 denier, the aspect ratio as the collected yarns is so large that when mixing with the matrix, fiber balls can easily be formed in the stage at which they are still to be split or they have merely been extremely partially split into single fibers, and therefore it is not preferred. On the other hand, with greater than 10,000 denier, the number of the collected yarns is reduced and although their dispersion is good, the thick collected yarns are spottedly present and, in their splitting step, the collected yarn units tend to form fiber balls, and therefore it is not preferred. Thus, for splitting the collected yarns, it is an important requirement to split 60% or more thereof in the extruding step in order to enhance the reinforcing effect, more preferably 80% or more. If it is less than 60%, the average aspect ratio is too small to give a satisfactory reinforcing effect.

It is important to select the collecting agent and its pick-up in order to split 60% or more in the extruding step. The collecting agent which can exert such an effect should be one which is water-soluble and has film forming properties, and examples of such an effective one include natural products and derivatives thereof, for example, starch, cellulose derivatives (such as methyl cellulose, ethyl cellulose, hydroxymethyl cellulose, carboxymethyl cellulose etc.), sodium arginate etc. Examples of synthetic collecting agents are those of a polyvinyl alcohol type, for example, an unsaponified polyvinyl acetate emulsion, a cationized polyvinyl acetate emulsion, partially saponified PVA, completely saponified PVA etc. Examples of modified PVA include itaconic acid-modified, phthalic acid-modified and acrylic acid-modified PVA's. Further, an ethylene-vinyl acetate copolymer emulsion obtained by copolymerizing vinyl acetate and ethylene, and also emulsions of its saponified product, a copolymer of vinyl acetate-maleic acid, a copolymer of vinyl acetate-crotonic acid and a copolymer of vinyl acetate-acrylic acid are employed. As the monomer for modifying polyvinyl alcohol, a cation-modified PVA obtained by copolymerizing

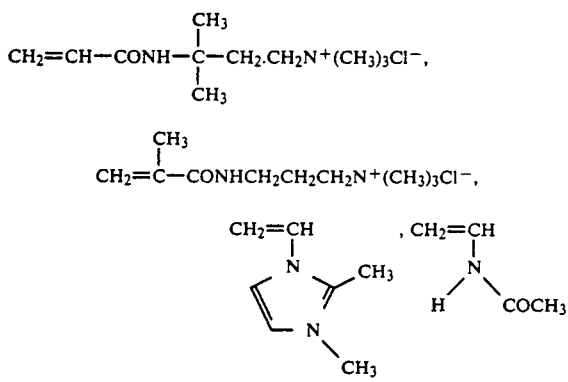

and a vinyl acetate momoner and alkali saponifying may be employed. As the modified PVAc, it is possible to employ an emulsion of a water-soluble polymer of e.g. PVA employing as a protective colloid a vinylic polymer which contains a polymerizable quaternary ammonium salt represented by

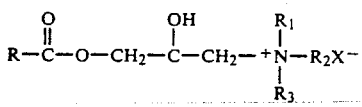

as one component in the polymer. Furthermore, it is also possible to employ a cationic ethylene-vinyl acetate emulsion obtained by copolymerizing ethylene and a vinyl acetate monomer with

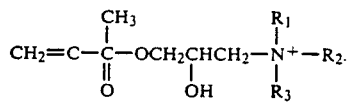

Specifically mentioned hereinabove are those in which the polymers exhibit the cationic properties and are effective collecting agents especially for enhancing the adhesion with cement.

Secondly, as the acrylic polymers, those of a cationic type such as sodium polyacrylate, partially saponified products of polyacrylates, partially saponified products of polyacrylate copolymers, polymethacrylate salts, polyacrylamides, especially 2-aminoethyl acrylate, 2-aminoethyl methacrylate etc. are effective as controlling agents in view of the adhesion. The above-described water-soluble polymers and emulsions may be employed either alone or in combination of two or more thereof.

As regards the pick-up of said collecting agent onto the fibers, if the pick-up is less than 2% by weight based on the fiber, the collecting properties after cutting are deteriorated, whereas with greater than 15% by weight, many troubles in production are brought about, and collected yarns are not easily formed. The pick-up is preferably 4-8% by weight. The deposited collecting agent is dried and heat treated to firmly fix and solidify onto the fibers and these long fibers are collected and heat set. A low temperature such as less than 100° C. is disadvantageous not only beacuse heat setting cannot be achieved but also because the treating speed must be reduced. On the other hand, a temperature exceeding 270° C. gives rise to troubles, for example, a part of the water-soluble polymer is decomposed and hardens, etc., and therefore the temperature conditions out of that range cannot be selected.

As described above, the conditions which the PVA fibers should satisfy for greatly reinforcing extruding hydraulically setting materials are that they must be those obtained by collecting single fibers having a single fiber denier of 0.5-25 denier and strength of 40 kg/mm$^2$ or more with 2-15% by weight of a water-soluble collecting agent so as to give a total denier of 200-10,000 denier, in which the aspect ratio of the single fiber units is 50-700 and in which the degree of splitting into single fibers in the extruding material is 60% or more.

The aforesaid PVA fibers may be produced by the process described below, but any may be employed regardless of the process as long as the single fibers are 0.5-25 denier and 40 kg/mm$^2$ in strength.

A general production process comprises employing a solution of PVA in a water soluvent as a stock solution, and there are two spinning processes, one being the dry spinning process which comprises evaporating water with hot air so as to form filaments from a spinneret and the other being the wet spinning process which comprises dehydrating and gelling in a bath of sodium sulfate or caustic soda or a mixture of both.

Alternatively, a special process in which boric acid is added to a stock solution and an alkaline salt is employed as a coagulating bath may also be employed as the wet process Fibers drawn to such degree that the single fiber strength is 40 kg/mm$^2$ or more are employed. The thus obtained fibers are wound up as long fibers.

In order to make the total denier of the collected yarns 200-10,000 denier, one or more bundles of the aforesaid long fibers may be fixed with a collecting agent. More preferably, bundles of long fibers, each bundle having 200-10,000 denier, are prepared and they are directly fixed with a collecting agent. These long fibers may be continuously transferred from a beam creel and dipped in a collecting agent bath to deposit it, or may be deposited with a collecting agent by a roller touch mode and squeezed off by a subsequent squeezing extractor to give a certain pick-up. The collecting agent to be used on this occasion is that selected from the sizing agents described above and appropriate to the degree of splitting of the collected yarns. It is desirable to conduct depositing by employing a water-soluble polymer at a concentration of 100 g/l or less and a viscosity of the sizing agent of 50 poise or less, preferably 10 poise or less, and using conditions where the pick-up, handling properties and processing latitude are all favored.

The drying temperature is desirably low, i.e. about 80°–200° C., preferably 120°–180° C. Further, it is more desirable to heat treat to fix the polymer deposited on the surface of the long fibers and to treat at 100°–270° C. in order to control the water solubility, preferably 150°–240° C.

In the drying step, it is mainly aimed to dry the surface of the collecting agent, and for better processing latitude and for preventing gum-up onto the bench, there are a hot air mode and a hot roller mode. Drying is effected at a relatively high temperature such as 130°–300° C. in the hot air mode and at 80°–130° C. in the case of the hot roller mode. Further, in the heat treatment step, a hot roller touch mode is employed in order to enhance the heat transfer efficiency and the heat treatment effect, and in the 100°–180° C. hot air mode, the heat treatment is conducted at 180°–270° C.

The thus obtained collected yarns are wound up in the form of bundles of several yarns while preventing loosening. The tow-formed product thus obtained is cut into the predetermined lengths using a cutter thereby the intended collected yarns are obtained. The pick-up of the collecting agent is controlled to the predetermined level by controlling the concentration or viscosity by calculating from the amount of the polymer taken by the yarns and further by controlling the amount squeezed off on the squeezing extractor. Needless to say, it is also possible to directly produce them from long fibers after spinning without once being wound up. For adjusting the splitting properties of the cut collected yarns, a kneader as designated by JIS R 5201 (Physical Testing Method of Cement) was employed and kneading was conducted at a sand to cement ratio of 1/1 and a water to solids ratio of 0.40 for 3 minutes. The fiber containing mortar was then washed out through a 50-mesh screen according to JIS A 1103 (Washing Testing Method of Aggregates) to prepare standard samples for the degree of splitting.

| Sample | Degree of Splitting |
|--------|--------------------|
| A | 0–20 |
| B | 20–40 |
| C | 40–60 |
| D | 60–80 |
| E | 80–100 |

In the above, splitting of 0–20% is the state where the collected yarns are entirely unsplit or single fibers have been partially split and mixed with the collected yarns. Splitting of 20–60% is the state where the number of the yarns in the single fiber state is relatively large and the total denier number of the collected yarns is relatively reduced. Splitting of 60–100% is the state where the majority of the collected yarns have been split into single fibers and dispersed and in which the reinforcing effect is the greatest, thus falling into the scope of this invention.

The degree of splitting of the collected yarns into single fibers may be judged as follows: PVA collected yarns are mixed and kneaded with a hydraulically setting matrix along with additives which are added as needed, extruded, then the uncured extruded product is immediately taken and placed on a 50-mesh screen, after which the hydraulically setting material etc. is carefully washed out with water and comared with the standard samples. If it is impossible to judge immediately after extruding and the cured product has to be judged, the sample may be broken by bending or applying a tensile stress and the broken surface may be microscopically observed for judgement.

The amount of the PVA collected yarns to be added to the extruding material is preferably 0.1–3% by weight. With less than 0.1%, the reinforcing effect is small, whereas with greater than 3%, it is difficult to disperse the fibers and also it is economically undesirable because of the increased cost.

As has been described above, it has now been discovered that by employing PVA fibers inherently excellent in reinforcing properties for hydraulically setting matrixes as collected yarns, they can be uniformly dispersed in a extruding material and by splitting 60% or more into single fibers, a remarkable reinforcing effect may be achieved. In other words, since the PVA fibers which have high strength, high modulus and good adhesion with hydraulically setting matrixes are present in the extruding material in the thin and long form, the mechanical characteristics such as tensile strength, bending strength, shear strength, impact strength etc. are enhanced. Further, it is also effective to improve the resistance to crazing, dimentional stability etc., which are the important characteristics required of the extruding material. Since the fibers present in the matrix prevent the propagation of locally generated small cracks, the prevention of crazing is resulted. Therefore, the more the number of the fibers in the adhered state present in the matrix, that is, the shorter the fiber distance, the greater the preventing effect. The reasons for the effect on the dimentional stability are not fully understood, but similarly as in the case of the resistance of crazing it is presumed that a great number of PVA fibers having good adhesion suppress the microscopic dimentional change and hence the macroscopic dimention is stabilized. Such PVA fibers excellent in reinforcing properties may well be employed as substitutes for asbestos fibers.

In general, asbestos fibers of Classes 6 and 7 having very short fiber lengths are employed in extruding materials in amounts of 20–30% by weight. By appropriately selecting the amount of PVA fibers to be used within the range of 0.1–3% by weight, it is also possible to reduce asbestos fibers even down to zero, or it is also possible to reduce asbestos fibers and combine with PVA fibers. Further, by adding PVA fibers to the compositions currently employed, characteristics such as bending strength, impact strength, resistance to crazing, dimentional stability etc. may further be enhanced.

The hydraulically setting material applicable in the present invention may be any which can cure in the presence of an appropriate amount of water. Representative examples thereof include cements such as Portland cement, blast furnace cement, silica cement, fly ash cement, alumina cement etc. and also gypsums, calcium silicate, magnesium carbonate, calcium carbonate etc., which may be employed either singly or in admixture.

Additionally, various aggregates may also be employed in combination according to the purposes, for example, lightweight aggregates such as shirasu balloons, perlite etc., pozzolan for improving the dimentional stability, stone dust, silica dust, calcium carbonate dust etc. for imparting surface evenness, and so forth.

Further, it is also possible to use a suitable amount of a plasticizer such as methyl cellulose etc. for imparting appropriate viscosity and improving moldability and shape retaining properties. Still further, a combined use of PVA fibers with other organic fibers or inorganic fibers is possible. While mixing of the PVA fibers into a hydraulically setting matrix is most suitably conducted under dry conditions, the fibers may be added to the matrix to which water has been already added. The curing temperature after extrusion is preferably up to 110° C. taking into consideration the characteristics of the PVA fibers in the presence of water.

In this connection, the use of collected yarns in extrusion is known with glass fibers. However, said collected yarns are completely different from the present invention in the intended purposes. More specifically, in the case of the glass fibers, the glass is a brittle substance per se and has a drawback that it is very fragile and easily breakable. And as a countermeasure, collecting is conducted to compensate the fragility with the thickness and therefore the collecting agent selected is, quite contrary to the case of the present invention, that which does not permit splitting into single fibers. Even such a collected state, as described above in the case of the extruding material, is damaged by a shear force by a screw, and sometimes reduced to fragments, thus hardly showing reinforcing properties.

As described above, the extruding materials reinforced with PVA fibers provide long continuous extruded products, as obtained by the conventional extrusion, not restricted in terms of the length, and various cross-sectional shapes may be freely chosen, which in turn renders working easy, further, in addition to the excellent performance such as light-weightness, heat insulating properties, sound insulating properties etc. owing to blow molding, the bending strength, impact strength, resistance to crazing, dimentional stability etc. are improved, and therefore, the development into a wide range of applications may be expected. For example, they may be employed in various applications, such as facing materials as well as interior materials, e.g. wall materials, floor materials etc., underroof plates, exterior materials etc. for gymnasiums, offices, factories, warehouses, shops, ordinary houses etc., further steel frame groundworks, wood frame groundworks etc. In the civil engineering industry field, it is needless to say that they may be employed as partition materials and sound insulating, safety materials such as both side wall materials etc. for general roads, highways, railroads etc. Still further, it is also possible to apply them to water conduits, side groove materials, sheet piles etc. However, the present invention should in no way be limited to the above scope.

The present invention is more particularly described by the following examples.

EXAMPLES 1-3 and COMPARATIVE EXAMPLES 1 & 2

Vinylon*, commerical name RMS 182 produced by Kuraray Co., Ltd., obtained by collecting a PVA fiber having a single fiber denier of 1.8 denier and strength of 150 kg/mm$^2$ into 1,800 denier using 6% of a cationized polyvinyl acetate emulsion produced by Kuraray Co., Ltd. was cut into, calculated as the aspect ratio of the single fiber units, 100 (Example 1), 400 (Example 2), 600 (Example 3), 30 (Comparative Example 1) and 1,000 (Comparative Example 2) respectively.

(Note) *Vinylon: General name for polyvinyl alcohol fibers in Japan

One percent by weight of each PVA fiber was mixed with 55% by weight of Portland cement, 42.5% by weight of calcium carbonate and 1.5% by weight of methyl cellulose as a plasticizer under dry conditions, and thereafter 15% by weight based on the solids of water was added.

The above mixture was kneaded using a kneader having a screw diameter of 100 mm and extruded using an extruder also having a screw diameter of 100 mm through a die at an extrusion pressure of 30 kg/cm$^2$ to prepare each extruded product having the transverse cross-section as shown in FIG. 1. After four weeks' natural curing, the bending strength of each was measured and given in Table 1.

TABLE 1

|  | Aspect Ratio | Dispersibility | Splitting Properties | Bending Strength kg/cm$^2$ |
|---|---|---|---|---|
| Example 1 | 100 | ⊚ | E | 200 |
| Example 2 | 400 | ⊚ | E | 250 |
| Example 3 | 600 | O | E | 240 |
| Comparative Example 1 | 30 | O | E | 150 |
| Comparative Example 2 | 1,000 | Δ | D | 170 |

Dispersibility ⊚: Very good, O: Good, Δ: Slightly poor, X: Poor

Splitting properties were judged by the method described hereinabove.

When the above specimens were exposed outdoors, the examples showed less dimentional change and less cracking as compared with the comparative examples.

EXAMPLES 4 & 5 and COMPARATIVE EXAMPLE 3

Vinylon, commercial name RMS 182, produced by Kuraray Co., Ltd. obtained respectively by collecting PVA fibers having a single fiber denier of 1.8 and various strengths with 6% of a cationized polyvinyl acetate emulsion into 1,800 denier were cut into, calculated as the aspect ratio of the single fiber denier units, 400.

The draw ratios were changed on the fiber fabrication thereby the strengths of the single fibers obtained were 60 kg/mm$^2$ (Example 4), 120 kg/mm$^2$ (Example 5) and 25 kg/mm$^2$ (Comparative Example 3) respectively.

The above PVA collected fibers were processed similary as in Examples 1-3 to prepare extruding materials and evaluated.

TABLE 2

|  | Single Fiber Strength (kg/mm$^2$) | Dispersibility | Splitting Properties | Bending Strength kg/cm$^2$ |
|---|---|---|---|---|
| Example 4 | 60 | ⊚ | E | 205 |
| Example 5 | 120 | ⊚ | E | 240 |
| Comparative Example 3 | 25 | ⊚ | E | 105 |

EXAMPLES 6-9 and COMPARATIVE EXAMPLES 4 & 5

Vinylon, commercial name RFS 602 produced by Kuraray Co., Ltd., obtained respectively by collecting a PVA fiber having a single fiber denier of 2 and strength of 130 kg/mm$^2$ into various total denier by using 5.5% of PVA-105 produced by Kyraray Co., Ltd. were cut into, calculated as the aspect ratio of the single fiber units of 450. The total denier numbers were 300 (Example 6), 1,200 (Example 7), 300 (Example 8), 8,000 (Examples 9), 50 (Comparative Example 4) and 15,000 (Comparative Example 5) respectively.

One percent by weight of each RFS was mixed with 57.5% of Portland cement, 30% of stone dust, 10% of shirasu balloons and 1.5% of methyl cellulose under dry conditions, and then 18% based on the solids of water was added.

Thereafter, the same procedures as in Examples 1-3 were repeated to prepare extruding materials, and the results of the measurements of those are given in Table 3.

TABLE 3

|  | Total Denier No. of Collected Yarns | Dispersibility | Splitting Properties | Bending Strength |
|---|---|---|---|---|
| Example 6 | 300 | ○ | E | 205 |
| Example 7 | 1,200 | ◉ | E | 240 |
| Example 8 | 3,000 | ◉ | E | 230 |
| Example 9 | 8,000 | ○ | D | 210 |
| Comparative Example 4 | 50 | X | E | 145 |
| Comparative Example 5 | 15,000 | X | D | 130 |

When the above specimens were exposed outdoors and observed, the examples showed less dimentional change and there was almost no cracking, as compared with the comparative examples.

EXAMPLES 10 & 11 and COMPARATIVE EXAMPLES 6 & 7

Vinylon, commercial name RFS 602 produced by Kuraray Co., Ltd., obtained respectively by collecting a PVA fiber having a single fiber denier of 2 and strength of 130 kg/mm$^2$ into 1200 denier by using 7% (pick-up) of various collecting agents were cut into, calculated as the aspect ratio of the single fiber units, 300.

The collecting agents employed were PVA-110 produced by Kuraray Co., Ltd. (Example 10), cationized polyvinyl acetate emulsion produced by Kuraray Co., Ltd. (Example 11), PVA-217 produced by Kuraray Co., Ltd. (Comparative Example 6) and completely saponified PVA (Comparative Example 7) respectively.

Using said collected yarns, extruding materials were prepared similarly as in Examples 6-9, and the results of their evaluation are summarized in Table 4.

TABLE 4

|  | Collecting Agents | Dispersibility | Splitting Properties | Bending Strength kg/cm$^2$ |
|---|---|---|---|---|
| Example 10 | PVA-110 | ○ | D | 210 |
| Example 11 | Cationized Polyvinyl Acetate Emulsion | ○ | E | 230 |

TABLE 4-continued

|  | Collecting Agents | Dispersibility | Splitting Properties | Bending Strength kg/cm$^2$ |
|---|---|---|---|---|
| Comparative Example 6 | PVA-217 | ○ | C | 160 |
| Comparative Example 7 | Completely Saponified PVA | ○ | B | 130 |

EXAMPLES 12-14 and COMPARATIVE EXAMPLES 8-11

Vinylon, commercial name RMS 182 produced by Kuraray Co., Ltd., obtained by collecting Vinylon having a single fiber denier of 1.8 denier and strength of 150 kg/mm$^2$ produced by Kuraray Co., Ltd. into 1,800 denier using 6% of cationized polyvinyl acetate emulsion produced by Kuraray Co., Ltd. were cut into, calculated as the aspect ratio of the single fiber units, 450.

Varied amounts of said collected yarns were mixed with 50% by weight of Portland cement, 5% by weight of asbestos 6B and the methyl cellulose and calcium carbonate in amounts as set forth in Table 5 according to the amount of the collected yarns added, under dry conditions, and 23% based on the solids of water was added, thereafter the same procedures as in Examples 1-3 were repeated to prepare extruding materials and measured. The results are given in Table 5.

The amounts of Vinylon RMS produced by Kuraray Co., Ltd. added were 0.5% (Example 12), 1.5% (Example 13), 2.5% (Example 14), 0% (Comparative Example 9), 0.05% (Comparative Example 10) and 4.5% (Comparative Example 11) respectively.

TABLE 5

|  | Amount of Fiber Added (%) | Calcium Carbonate (%) | Methyl Cellulose (%) | Dispersibility | Splitting Properties | Bending Strength (kg/cm$^2$) |
|---|---|---|---|---|---|---|
| Example 12 | 0.5 | 43.5 | 1.0 | ◉ | E | 250 |
| Example 13 | 1.5 | 41.5 | 2.0 | ○ | E | 250 |
| Example 14 | 2.5 | 38.5 | 3.0 | Δ-○ | D | 340 |
| Comparative Example 9 | 0 | 54.0 | 1.0 | ◉ | — | 135 |
| Comparative Example 10 | 0.05 | 53.95 | 1.0 | ◉ | E | 141 |
| Comparative Example 11 | 4.5 | 36.5 | 4.0 |  | D | 180 |

In Comparative Example 11, the appearance was remarakbly deteriorated.

The above specimens were exposed outdoors, and the conditions were observed, to find that the examples were more stable in the dimention as compared with the comparative examples and there was almost no cracking.

What is claimed is:

1. A process for producing hydraulically setting materials which is characterized by dispersing in said material as a reinforcing fiber collected yarns which are obtained by fixing polyvinyl alcohol fibers with a water-soluble collecting agent to 200-10,000 denier and cutting said fibers so that the aspect ratio of the single fiber unit is 50-700, and 60% or more of which is split into single fibers during extrusion.

2. The process for producing hydraulically setting extruding material according to claim 1 wherein the single fiber unit has a single fiber denier of 0.5-25 denier and a tensile strength of 40 kg/mm$^2$ or more.

3. The process for producing hydraulically setting extruding material according to claim 1 or 2 wherein the amount of the polyvinyl alcohol collected yarns dispersed in said material is 0.1–3% by weight.

4. The process of claim 1 wherein the aspect ratio of the single fiber unit is 200 to 500.

5. The process of claim 1 wherein the collected yarns are obtained by fixing polyvinyl alcohol fibers with a water-soluble collecting agent to 1,000 to 5,000 denier.

6. The process of claim 1 wherein 80% or more of the collected yarns are split into single fibers during extrusion.

7. The process of claim 1 wherein the water-soluble collecting agent comprises a natural product, a derivative of a natural product, a synthetic product or a mixture thereof.

8. The process claim 1 wherein the water-soluble collecting agent comprises a starch, a cellulose derivative, sodium arginate, an unsaponified polyvinyl acetate emulsion, a cationized polyvinyl acetate emulsion, a partially saponified polyvinyl alcohol, a completely saponified alcohol, an itaconic acid-modified polyvinyl alcohol, a phthalic acid-modified polyvinyl alcohol, an acrylic acid-modified polyvinyl alcohol, an ethylene-vinyl acetate copolymer emulsion, an emulsion of a saponified ethylene-vinyl acetate copolymer, a vinyl acetate-maleic acid copolymer, a vinyl acetate-crotonic acid copolymer, a vinyl acetate-acrylic acid copolymer or a mixture thereof.

9. The process of claim 1 wherein the hydraulically setting extruding material comprises Portland cement, blast furnace cement, silica cement, fly ash cement, alumina cement, gypsum, calcium silicate, magnesium carbonate, calcium carbonate or a mixture thereof.

10. The process of claim 1 wherein the hydraulically setting extruding material further comprises perlite, pozzolan, stone dust, silica dust, calcium carbonate dust, a plasticizer, organic fibers or mixtures thereof.

* * * * *